May 17, 1955

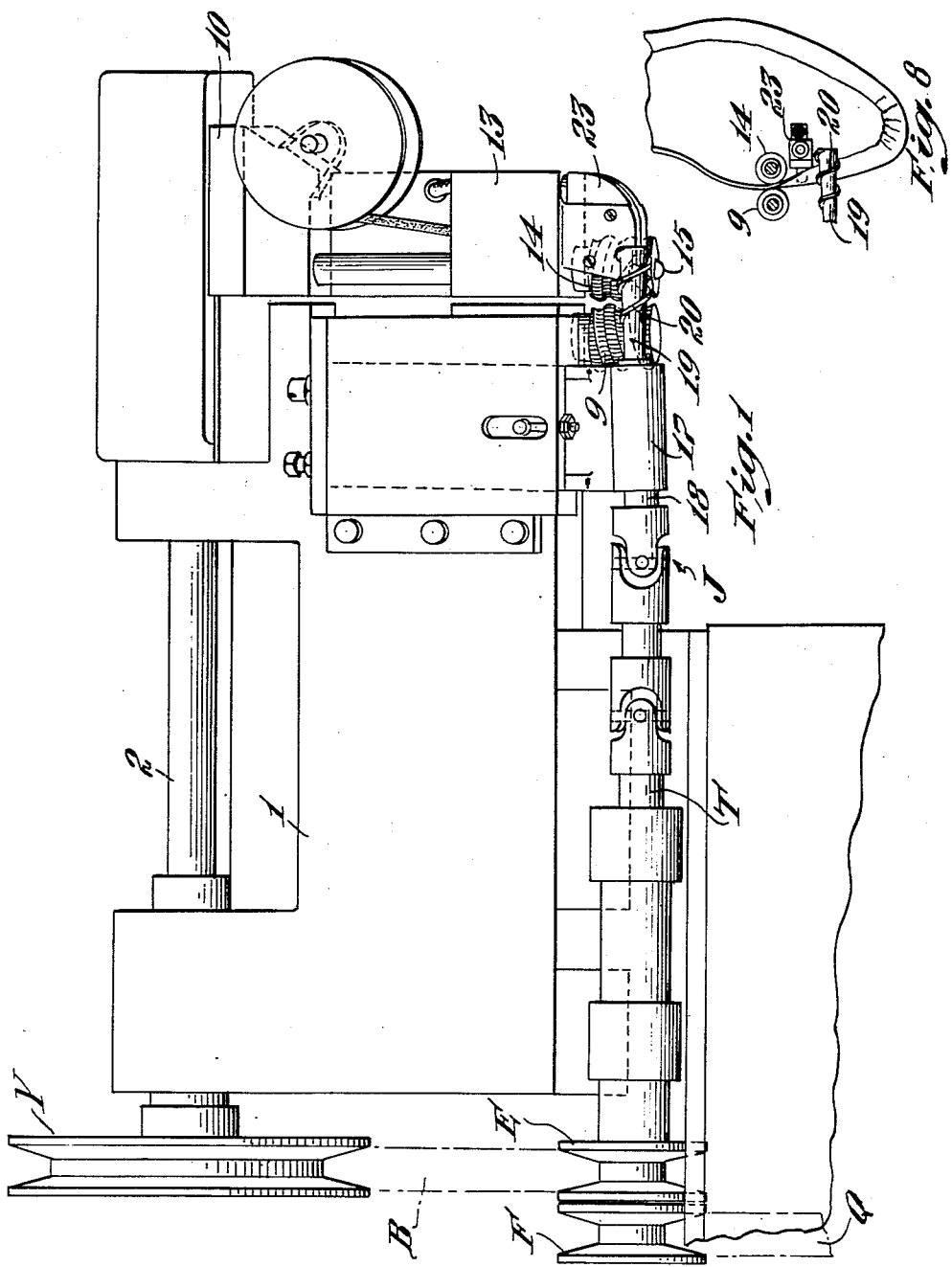

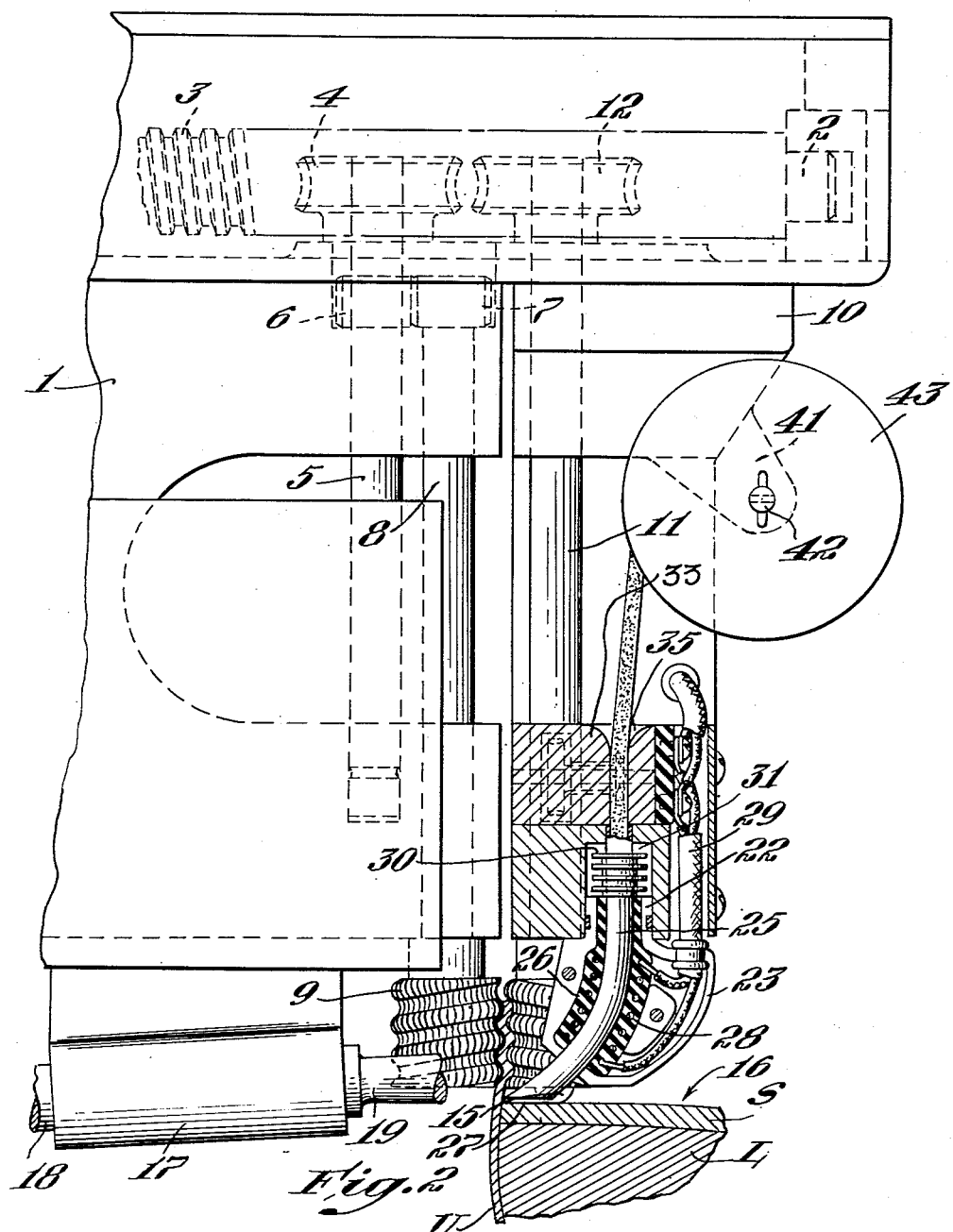

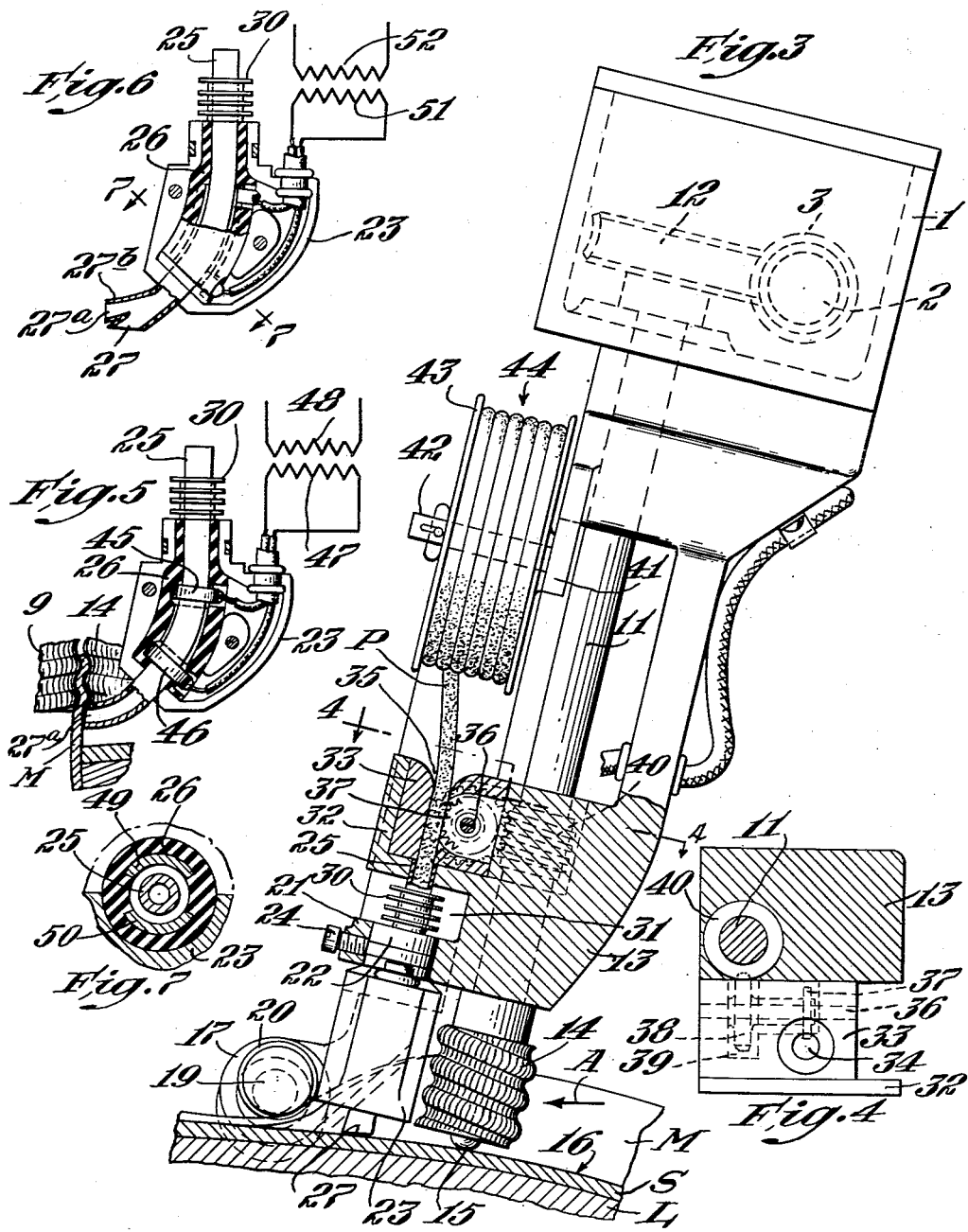

J. S. KAMBORIAN 2,708,278

MACHINE FOR CEMENT LASTING

Filed Nov. 21, 1952

Inventor
Jacob S. Kamborian
by Roberts, Cushman & Grover
att'ys.

United States Patent Office 2,708,278
Patented May 17, 1955

2,708,278

MACHINE FOR CEMENT LASTING

Jacob S. Kamborian, West Newton, Mass.

Application November 21, 1952, Serial No. 321,775

26 Claims. (Cl. 12—8.3)

This invention pertains to lasting machines, useful for lasting footwear, and performing an analogous operation on luggage, upholstery, etc. For specific example, but without limiting intent, the invention is here disclosed as designed to apply an adhesive to the margin of the upper and/or to the insole, or equivalent element of a shoe, as a step in the lasting operation.

It has heretofore been proposed to apply a normally fluid adhesive to parts of the shoe during the operation of lasting, but for successful lasting any adhesive so applied must be capable of setting almost instantly after application. Adhesives of this type are difficult to handle because of this quick-setting characteristic.

To overcome the disadvantages characteristic of quick-setting liquid adhesive, solid, non-tacky, adhesive was subjected to liquefying temperature close to the desired point of application, atomized and projected on the work in the form of a spray the atomization being effected by a spray nozzle or gun having a heating element incorporated in it after the fashion of a Schoop gun. This likewise proved disadvantageous for lasting purposes due to the fact that the work moves rapidly so that the distribution of the droplets of adhesive is too sparse, that is, there is insufficient adhesive to make a good bond, the fineness of the droplets causes too rapid drying and setting so that there is not sufficient time for it to penetrate the substance of the work and hence become securely anchored thereto and because it is impractical to control the spray within such limits as to prevent accumulation in objectionable quantity on the parts of the machine and the adjacent parts of the work, with the result that the machine itself becomes very dirty and the work is frequently soiled.

One object of the present invention is to provide novel lasting apparatus wherein adhesive is delivered as a continuous liquid ribbon to the shoe parts during lasting and with provision for advancing adhesive of a kind which is normally non-adhesive or has but little normal stickiness but which is flowable toward the delivery point and causing said adhesive to become temporarily liquid just before reaching the delivery point. A further object is to provide lasting apparatus having provision for advancing a body of thermoplastic adhesive toward the point of application and quickly heating the adhesive just prior to its application so that it becomes temporarily fluid and sticky. A further object is to provide lasting apparatus having provision for advancing normally non-tacky but flowable adhesive in ribbon form (shape-retaining, even though unconfined, at normal temperatures) toward the point of use, with suitable means for applying heat to the advancing end portion of the adhesive to cause it to become fluid and sticky. A further object is to provide means for advancing the end of an elongate normally solid adhesive body to a place of application, rendering it viscous at that point and while undiminished in homogeneity and viscosity pressing its mass into direct contact with the work. A further object is to advance the solid adhesive body by the application of pressure thereto and to remove the pressure in the absence of work to prevent waste of adhesive.

It is to be understood that the term "flowable," as here used, is intended to connote the physical characteristic of capability of moving, passing or flowing continuously through a confining guide passage or conduit (whether straight or not).

A further object is to provide lasting apparatus having provision for directing adhesive material, in the form of a ribbon toward the point of application and for causing the adhesive material to become fluid and temporarily adhesive just prior to its application. Other and further objects and advantages of the invention will be pointed out in the following more detailed description and by reference to the accompanying drawings wherein:

Fig. 1 is a fragmentary side elevation of a lasting machine embodying the present invention, the machine being designed to use thermoplastic adhesive in the form of a ribbon;

Fig. 2 is a fragmentary elevation, to larger scale, showing the head of the machine with the operating parts, the wiper being broken away and a portion of the adhesive-supplying means being shown in vertical section;

Fig. 3 is a fragmentary elevation, looking rearwardly toward the front face of the head of the machine, showing a part of a shoe (in longitudinal section) in the operating position, a portion of the adhesive-supplying means being in vertical section;

Fig. 4 is a horizontal section substantially on the line 4—4 of Fig. 3;

Fig. 5 is a vertical section, in a plane similar to that of Fig. 2, showing adhesive-delivery means of a modified construction;

Fig. 6 is a view similar to Fig. 5 but showing a further modification;

Fig. 7 is a fragmentary section on the line 7—7 of Fig. 6;

Fig. 8 is a diagrammatic plan view, partly in horizontal section, illustrative of the mode of using the machine;

Figure 9:
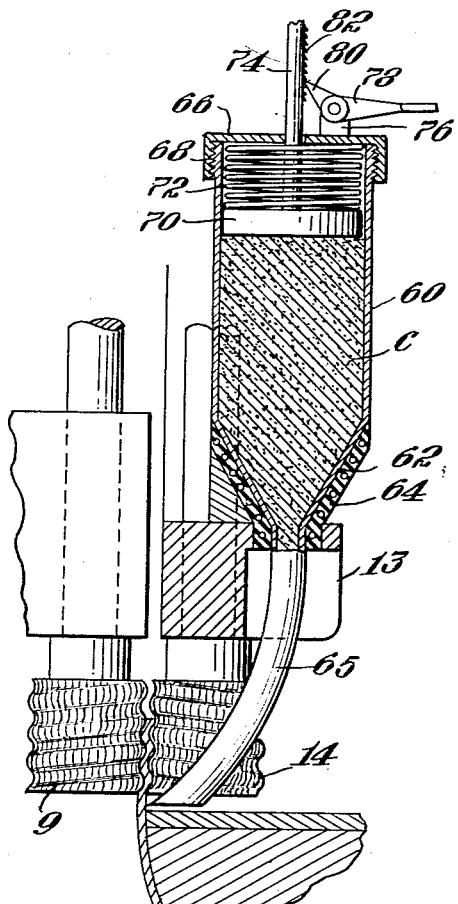
Fig. 9 is a fragmentary elevation corresponding to Fig. 2 omitting the head of the machine and showing an alternative adhesive supplying means.

The invention is herein illustrated, by way of example but not with limiting intent, as embodied in a lasting machine wherein the lasting margin of the shoe is simultaneously advanced and subjected to updraft by means including at least one constantly rotating roll, in other words, a machine of the continuous or progressive type. As herein employed, the term "lasting margin" is to be understood as inclusive of the wrapper or platform cover of a California or force-lasted shoe as well as the marginal portion of the upper of more conventional shoes, for instance, Goodyear-welt or McKay shoes.

While the application, during progressive lasting of adhesive in the form of an atomized spray, as suggested in the patent to Kamborian No. 2,254,224 dated September 2, 1941, is possible when the lasting margin is of very soft, flexible material, such as thin cloth, and particularly when this lasting margin is a platform wrapper of a shoe of the California or force-lasted type, the application of adhesive in the form of such a spray is very wasteful of adhesive; the adhesive so applied enters the crevices between the updrafted lasting margin and the edge of the sole element and makes it more difficult to draft the margin inwardly and about said edge, and when the lasting margin is of heavy or relatively inflexible material, for example leather, the amount of adhesive capable of application as a spray during the short time interval permissible, is not sufficient to insure proper adhesion. In order to provide an adequate quantity of adhesive properly located for most effective use, and without waste, the present invention provides for delivering the adhesive as an uninterrupted band or ribbon or substantially uniform width, and spaced from the edge of the insole or other bottom element and in a temporarily tacky and strongly adhesive condition, capable of uniting and holding the parts in opposition to the contractile force exerted by the tensioned upper.

Referring to the drawings, the numeral 1 designates a portion of the head of a lasting machine of the continuous type. A horizontal drive shaft 2 is mounted to turn in bearings in the head 1, being driven continuously during the machine operation by any suitable means. As here shown, the rear end of the shaft 2 carries a driven pulley Y which is embraced by a belt B passing about a pulley E. The forward portion of the shaft 2 is provided with a worm 3 (Fig. 2) which constantly meshes with a worm wheel 4 fixed to the upper end of a shaft 5 mounted in suitable bearings in the machine head. A pinion 6 meshes with a similar pinion 7 fixed to the upper end of a shaft 8 parallel to shaft 5 and which turns in bearings carried by the machine head, and which is provided at its lower end with a work-engaging roll 9. As here illustrated, this roll is cylindrical and provided with a helical peripheral rib.

The machine head is provided with guideways for guiding a slide 10 movable horizontally from front to rear. A spring (not shown) urges the slide rearwardly, and means (not shown), for example, a treadle and appropriate connections, provides for moving the slide forwardly at the will of the operator. This slide member has bearings for a shaft 11 (parallel to shaft 5) provided at its upper end with a worm wheel 12 which constantly meshes with the worm 3 on the shaft 2. The lower bearing 13 for the shaft 11 is rigidly connected to or integral with the slide 10. The shaft 11 projects below the bearing 13 and is provided at its lower end with a work-engaging roll 14 which cooperates with the roll 9 to grip the lasting margin of the shoe, and when the machine is in operation to advance the work while simultaneously subjecting the lasting margin to updrawing stress. The roll 14, as illustrated, is cylindrical, having a helical rib like that of the roll 9. However, these work-engaging rolls may be of other shapes, familiar to those skilled in the art; and, if desired, one of these rolls may be replaced by a smooth-surfaced, normally stationary abutment, according to a known practice in the art.

As shown in Fig. 3, the shafts 8 and 11 are inclined downwardly and forwardly in the direction of advance of the work. Preferably the lower end of the roll 14 is provided with a hold-down button 15, here shown as substantially hemispherical, which engages the exposed surface 16 of the sole element S, thereby to prevent bodily upward movement of the shoe in response to the updraft exerted by the rolls 9 and 14. As shown in Fig. 2, the sole element S is mounted upon a last L, together with an upper U having the lasting margin M. The sole element S may be a true insole, a sock lining, a mid-sole, or a platform or cushion, according to the type of shoe being made.

An elongate bearing 17 (Fig. 1) is supported by the machine frame, and in this bearing turns a wiper-actuating shaft 18 which is driven by suitable means. As here shown, the shaft 18 is driven through a universal joint J, by a shaft T, turning in fixed bearings and on which pulleys E and F are fixed, the pulley F receiving a driving belt Q which is driven by a motor (not shown).

This shaft 18 projects from the forward end of the bearing 17 and carries the rotary wiper 19 having a helical, peripheral, work-engaging rib 20. During the operation of the machine, the wiper 19 is continuously rotated, the pitch of the helical rib 20 being such that as the wiper is rotated the rib exerts an inward thrust such as to urge the lasting margin inwardly while wiping it down against the surface 16 of the sole member S (Fig. 8). Preferably the bearing 17 is vertically adjustable.

The lower bearing 13 for the shaft 11 has a lateral arm or bracket portion 21 (Fig. 3) provided with an aperture which receives a short cylindrical stem 22 at the upper end of a housing 23. A set screw 24 holds the stem 22 in operative position but by loosening this screw the housing 23 may readily be withdrawn from the part 21, for example, for cleaning or for replacement by alternative forms of housing (Fig. 2).

An elongate, tubular guide 25 extends through the stem 22 into the interior of the housing, the lower portion of this tubular guide being bent in a smooth, rearwardly directed curve, as shown in Fig. 2. The lower end 27 of this tubular guide, as illustrated by way of example in Fig. 2, is substantially horizontal and in a plane such that it is disposed directly above but slightly spaced from the surface 16 of the sole element. The housing 23 (Fig. 2) is located in the lasting zone, that is to say, the space between the plane defined by the axes of the shafts 8 and 11 and the vertical plane of the wiper shaft 18, so that the lower end 27 of the tubular guide delivers adhesive into the angle between the upstanding lasting margin and the surface 16 and against the surface 16 of the sole member S just before the lasting margin M is wiped down onto the sole member.

As illustrated in Fig. 2, that portion of the tubular guide 25 which is within the housing 23 is surrounded by insulation 26 in which is embedded a resistance coil 28 which is supplied with electrical current by means of conductors passing through an insulating tube 29 and which are connected to any suitable source of supply. When supplied with current, the coil 28 highly heats the portion of the tubular guide 25 which is within the housing 23. Preferably that portion of the tubular guide which is exposed above the stem 22 of the housing is provided with heat radiating fins 30 which are located in an open space 31 between the bracket arm 21 and a second arm 32 (Fig. 3) projecting from the bearing member 13. The fins 30 help to avoid overheating the upper part of the tubular guide so as prematurely to soften the adhesive material. The arm 32 is provided with a cavity which receives a guide block 33 having a passage 34 (Fig. 4) which is aligned with the bore in the tubular guide 25, the upper end of said tubular guide fitting snugly in an opening in the bottom of the part 32 which is aligned with passage 34. As shown in Figs. 2 and 3, the upper end 35 of the passage 34 flares upwardly to provide an easy entrance. The passage 34 has a vertical slot in its wall, and a shaft 36, turning in suitable bearings in the part 32, carries a toothed feed wheel 37 which projects through the slot into the passage 34. The shaft 36 also carries a worm wheel 38 which meshes with a worm 40 fixed to the shaft 11.

A bracket 41 (Fig. 2) projects forwardly from the upper part of the slide 10 and carries a stub shaft 42 providing a support for a rotary reel 43 designed to carry a coil 44 of a ribbon P of thermoplastic adhesive. This ribbon is of a substance which, when hot, is liquid and highly adhesive, but which at normal temperatures is shape-retaining and non-tacky although "flowable" as above defined. Among thermoplastic adhesives having the desired characteristics may be mentioned, by way of example, plasticized polyvinyl acetate and plasticized ethyl cellulose.

When the machine is in operation, this flowable ribbon P extends from the coil 44 down through the passage 34 and into the guide tube 25. In passing endwise through the heating zone defined by the resistance coil 28, the ribbon is heated and becomes liquid and very sticky so that as it is exuded through the lower end 27 of the tubular guide 25 and contacts the surface 16 of the sole element S, it provides adhesive of a quick-setting character which is adequate firmly to anchor the lasted-in margin M as the latter is urged inwardly and downwardly by the wiper.

In Fig. 5 a modified arrangement is illustrated. In this view parts similarly numbered correspond to those shown in Fig. 2. In this arrangement, the delivery end 27a of the tubular guide 25 is in a vertical plane and so located that the adhesive exuding therefrom contacts the inner surface of the lasting margin M just before the latter is engaged by the wiper. Furthermore, instead of a resistance coil to provide the heat, the insulating sleeve 26 carries two spaced collars 45 and 46, respectively, constituting electrodes which are connected, respectively, to the opposite terminals of the secondary 47 of a high frequency generator, the primary 48 of which is supplied with current in a manner customary in high frequency heating apparatus, thereby setting up a field of great intensity between the electrodes 45 and 46 and thus quickly heating the ribbon P as it moves along the tubular guide 25 in the space between the electrodes 45 and 46.

In Figs. 6 and 7 a further modification is illustrated wherein parts, of similar type to those shown in Fig. 2, are similarly numbered. As shown in Fig. 6, the lower portion of the tubular guide 25 is bifurcated, having an upper branch 27b which terminates at 27a in a vertical plane. With this arrangement adhesive is delivered simultaneously to the inner surface of the lasting margin and to the surface 16 of the sole element. In this arrangement, the insulating sleeve 26 (Fig. 7) carries a pair of diametrically opposed, longitudinally extending electrodes 49 and 50 which are connected to the terminals of the secondary 51 of a high frequency apparatus having the primary coil 52. With this arrangement, a high frequency heating zone is set up between the electrodes 49 and 50 and thus quickly reduces the ribbon P, passing through the tubular guide 25, to a liquid and sticky condition. When employing such high frequency heating, as suggested in the arrangements of Figs. 5 and 6, it will be desirable to employ a non-metal for the tubular guide 25.

Obviously other and equivalent means for temporarily heating the adhesive ribbon on its way through the housing 23 may be substituted for those herein specifically suggested if desired. Whatever the source of heat employed, the heating zone is narrow, so that the adhesive will not be prematurely softened.

In the operation of the machine, and referring specifically to the arrangement shown in Fig. 2, and assuming that a coil 44 of the flexible, flowable adhesive ribbon P has been placed in operative position, and assuming that current is being supplied to the heating means, the operator may first set the machine in operation before placing a shoe in position, so as to cause the toothed wheel 37 to rotate. The end of the ribbon P is then pushed down into the entrance 35 to the passage 34 until the end portion of the ribbon is caught by the teeth of the wheel 37. This wheel bites into the ribbon and draws it off the reel and propels it endwise down into the tubular guide 25 and through the heating zone within the housing 23. When the advancing end of the flexible, flowable ribbon, delivered from the lower end 27 of the tubular guide, shows, upon examination, that it is fluid and sticky, the operator knows that the machine is in readiness for operation. He then enters the lasting margin M between the rolls 9 and 14, first moving the slide 10 forwardly, if necessary, to admit the lasting margin and then permitting the slide to resume its normal position, so that the margin is gripped firmly between the rollers.

The rollers immediately begin to advance the work and to exert updrafting stress. As the tensioned margin escapes from between the rotating rolls, it is engaged by the rotating wiper which exerts an inwiping stress tending to urge it inwardly and force it down against the sole member S. However, before the margin is actually engaged with the surface 16 of the sole element, the marginal portion of the sole element is coated with liquid adhesive delivered from the lower end 27 of the tubular guide 25, it being noted (Fig. 2) that the lower end 27 of the tubular guide is located within the angle defined by the surface 16 of the sole element and the upstanding margin M of the upper and close to the edge of the sole element.

The adhesive ribbon consists of material which, after being heated and thus rendered liquid and adhesive, sets very quickly as it cools so that, as it is engaged by the lasting margin, it rapidly cools and sets and thus firmly secures the lasting margin in place.

If the housing 23 of Fig. 5 be substituted for that shown in Fig. 2, the adhesive will be delivered directly to the inner surface of the margin M. If the housing 23 of Fig. 6 be used, the adhesive will be delivered simultaneously to the sole element and to the lasting margin in the form of independent ribbons which are coalesced during inwiping.

Figure 13:
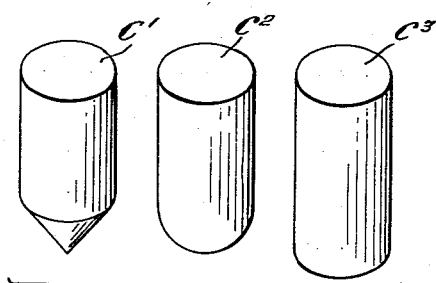
Fig. 13 shows in elevation three forms of solid adhesive which may be used.

As heretofore described the adhesive is stored in the form of a ribbon P, however, it is within the scope of the invention to supply the adhesive in the form of a normally non-tacky solid block, three possible forms being illustrated as C1, C2 and C3 in Fig. 13. When supplied in the form of a block of rigid non-tacky material a container of cylindrical form 60 (Fig. 9) is made fast to the lower bearing 13 and has a lower conical end 62 which is surrounded by a heating element 64. A tubular guide 65, connected to the lower end of the conical portion of the container, extends through the bearing 13 and its lower portion is bent in a smooth rearwardly directed curve so that its lower end is in a position to carry the soft adhesive directly into contact with the work. The upper end of the container 50 has applied at it a cap 66, the latter having internal threads 68 for engagement with threads on the outside of the container. A block of adhesive C is placed in the container so that its lower end is wedged into the conical end of the container. A plunger or other follower 70 is placed against the upper end of the block together with a coil spring 72, the latter being located between the plunger and cover 66 so as to apply a downward pressure on the block of adhesive thus constantly forcing its leading end into the conical end of the container. As the leading end becomes soft under the influence of the heating coil it is extruded by the pressure applied to its opposite end through the tube 65. To prevent extrusion of the softened adhesive when no work is being acted upon there is means for rendering the pressure on the block ineffective, this means being connected to the plunger. As illustrated in Fig. 9, a rod 74 is fastened to the plunger 70 and extends upwardly through the cover 66. On the cover there is a pair of spaced ears 76 between which is pivoted a lever 78. The forward end of the lever 78 has a spur 80 and the rod 74 has teeth 82 with which the spur may be engaged by depressing the rear end of the lever in a clockwise direction. Depression of the rear end of the lever will lift the rod so as to draw the spring pressed plunger just out of contact with the adhesive and at the same time will jam the spur against the rod so that it will not slip back under the spring pressure. By striking the lever with a quick sharp blow the spur may be disengaged from the teeth and the rod freed so that the plunger will again force the adhesive downwardly. By releasing the pressure on the adhesive drip is prevented. While the means for releasing pressure on the adhesive is shown as manually operable, it is clearly within the scope of the invention to connect it by way of suitable linkage to the treadle for moving the rolls 9 and 14 into and out of engagement so that cement will be delivered only while the rolls are in contact with the work. Such mechanism would be inoperative when the rolls were in direct contact with each other as when no work was interposed therebetween.

Figure 10:
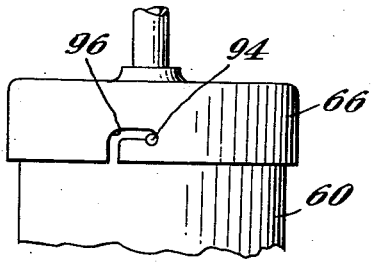
Fig. 10 is a fragmentary elevation of a modified cover for the adhesive containing receptacle.

In Fig. 10 an alternative construction for fastening the cover to the container is shown wherein a pair of pins 94 are made fast to the walls of the container at diametrically opposite points and the cover is provided with angular slots 96 which may be engaged with the pins to hold the cover in place.

Figure 11:
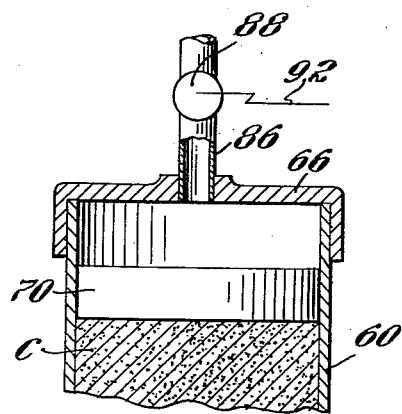
Fig. 11 is a fragmentary elevation partly in section showing an alternative method for applying pressure to the adhesive in the container.
Figure 12:
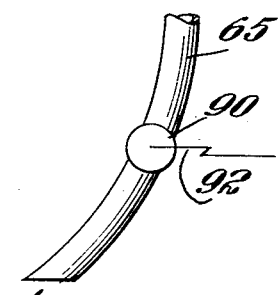
Fig. 12 is a fragmentary elevation of the adhesive delivery means showing a valve inserted therein.

In Fig. 11 the container is illustrated as having a cover 66 to the top of which there is connected a hollow conductor 86 for introducing air under pressure to the plunger 70 and hence to apply pressure to the solid adhesive. A valve 88 may be placed in the conductor 86 and connected by suitable linkages represented at 92 for opening the valve only when the feed rolls are held in spaced relations by the presence of work between them.

In some instances it may be desirable to place a shut-off valve 90 in the delivery tube 65 and to connect the valve by way of linkage 92 so that it will be open only when there is work between the feed rolls.

As heretofore indicated the adhesive may be supplied in the form of non-tacky normally solid blocks preferably of the shape shown at $C^1$ (Fig. 13) which is cylindrical and has a conical end so that when it is dropped into the container 69 the conical end will fall into the conical end of the container. By making the solid adhesive of the shape shown at $C^1$ it will soften up on initial introduction into the container very quickly, since it will have close contact with the conical end of the container. With a little longer heating time however a block such as shown at $C^2$ of cylindrical form and having a rounded end can be used or a cylindrical block such as shown at $C^3$ which has flat ends. In any event which ever type of block is used after initial softening it will then take the shape of the conical end of the container and thereafter soften up without any time delay.

While the rotary wiper herein specifically shown and described is preferred, other wiping means may be employed, for example, a reciprocating wiper such as disclosed in Kamborian Patent 2,251,284, dated August 5, 1941, and, as above noted, while upper gripping rolls such as here illustrated are useful and desirable, specifically different work-gripping and advancing means may be used, for instance, such as shown in the patents to Kamborian 2,314,047, dated March 16, 1943, or 2,450,667, dated October 5, 1948.

Moreover, while the adhesive may be made liquid so as to become sticky by the application of heat alone, it is contemplated that it may be subjected to the action of a suitable solvent as it passes along the tubular guide, or to a combination of heat and solvent.

While certain desirable embodiments of the invention have been illustrated and described by way of example, it is to be understood that the invention is broadly inclusive of any and all modifications falling within the scope of the appended claims.

I claim:

1. In a machine for stretching flexible covering material over one side of a substantially rigid form and securing it to the other side, operating instrumentalities operable to stress successive areas of the margin of material over the one side into contact with said other side, means for supplying a ribbon of solid, non-tacky, shape retaining adhesive toward the place of the applied stress before the margin is laid down and means for rendering the leading end of the ribbon tacky as it enters said place of stress without diminishing its homogeneity.

2. In a lasting machine, lasting instrumentalities operable to stress successive areas of the lasting margin of an upper against the bottom of a shoe, means for supplying a ribbon of solid, non-tacky, shape retaining adhesive toward the place of the applied lasting stress before the lasting margin is laid down against the bottom, and means for rendering the leading end of the ribbon tacky as it enters said place of lasting stress between the lasting margin and bottom without diminishing its homogeneity.

3. In a lasting machine of the kind described, instrumentalities including spaced updrafting and wiping means for effecting progressive lasting of the lasting margin of a shoe upper against the bottom of a shoe when held up to said instrumentalities, means operable to deliver a ribbon of solid non-tacky, shape-retaining adhesive toward the space between the updrafting and wiping means and means for rendering the leading end of the solid adhesive tacky as it enters said space without diminishing its homogeneity.

4. A lasting machine of the progressive type wherein the lasting margin of a shoe upper is subjected to updraft stress applied substantially perpendicular to the shoe bottom whose point of application advances uninterruptedly along the edge of the shoe bottom and wherein the updrafted lasting margin is then wiped in over the shoe bottom, means advancing an end of an elongate body of solidified non-tacky, shape-retaining adhesive toward the edge of the bottom at a place between the point of application of the updrafting stress and the place of wiping the lasting margin inwardly, means for rendering the leading end of the body tacky without diminishing its homogeneity and means for guiding the homogeneous tacky adhesive protected from the atmosphere directly into contact with the work.

5. In a lasting machine of the kind having spaced means for updrafting and inwiping the margin of the upper of a shoe held in a position to be operated upon by said updrafting and inwiping means, means operative to deliver a continuous ribbon of a liquid and sticky adhesive substance into the space between the updrafting and inwiping means, said adhesive delivering means comprising means for advancing an adhesive substance in a solid and non-tacky state, at a definite, predetermined rate, toward the space between the updrafting and inwiping means, and means for reducing said material to a liquid sticky state just before it enters the space between the updrafting and inwiping means.

6. In a lasting machine of the progressive type wherein the lasting margin of the upper of a shoe having a bottom, is subjected to updrafting stress whose point of application advances uninterruptedly along the edge of the shoe bottom and wherein the updrafted lasting margin is then wiped in over the shoe bottom, means for delivering adhesive in the form of a continuous sticky ribbon to the edge of the bottom at a place between the point of application of the updrafting stress and the place of inwiping, said adhesive delivering means comprising a support for adhesive in a normally non-tacky solid state, a tubular guide for conducting adhesive in the non-tacky condition from the support to the space between the point of application of the updrafting stress and the point of inwiping, positive feed means, including a driven feed element, located outside of the support and at a point between the support and said space, operative to advance the non-tacky adhesive along said guide, and means associated with the delivery end of the guide for reducing the advancing adhesive to the liquid sticky state.

7. In a lasting machine, instrumentalities for operating upon the lasting margin of a shoe to gather it inwardly against the bottom of the shoe, said instrumentalities having upper gripping means including a constantly rotating roll operative concomitantly to updraft the upper and to advance the work and means for wiping the updrafted lasting margin inwardly over the shoe bottom, means operative to deliver a continuous ribbon of a sticky adhesive material in flowable liquid condition into the angle between the updrafted upper and said shoe bottom, said adhesive delivering means comprising a constantly rotating feed element operative to advance a length of non-tacky material into the angle between the updrafted upper and said shoe bottom, and means operative to cause the advancing end portion of said length of material to become adhesive as it enters said angle.

8. In a lasting machine, instrumentalities for operating upon the lasting margin of a shoe to gather it inwardly against the bottom thereof, said instrumentalities having upper gripping means including a constantly rotating roll operative concomitantly to updraft the upper and to advance the work, means for wiping in the updrafted lasting margin, means for delivering a continuous ribbon of sticky liquid adhesive toward the angle between the updrafting lasting margin and the shoe bottom, said adhesive delivering means comprising a tubular guide whose lower end is disposed in the space between the upper gripping means and the wiping means, said tubular guide having a delivery orifice so located as to discharge a continuous ribbon of adhesive onto the exposed surface of a bottom of the shoe at a point close to the edge of said bottom, means to deliver adhesive in a non-tacky solid state into the upper end of the tubular guide, and means operative to reduce the adhesive to a sticky liquid condition as it nears the delivery orifice.

9. In a lasting machine, instrumentalities for operating upon the lasting margin of a shoe to gather the lasting margin inwardly against the bottom thereof, said instrumentalities having upper gripping means including a constantly rotating roll operative constantly to updraft the lasting margin of the upper and to advance the work and means for wiping in the updrafted lasting margin, means for delivering a continuous ribbon of sticky liquid adhesive, said adhesive delivering means comprising a tubular guide having a delivery orifice so located as to discharge adhesive onto the inner surface of the lasting margin at a point closely adjacent to but spaced from the shoe bottom and just before the margin is laid down by the wiping means, means operative to deliver adhesive in a non-tacky condition into the tubular guide, and means to reduce the adhesive to a sticky liquid condition as it nears the delivery orifice.

10. In a lasting machine, instrumentalities for operating upon the lasting margin of a shoe to gather the lasting margin inwardly against the bottom thereof, said instrumentalities having upper gripping means including a constantly rotating roll operative concomitantly to updraft the shoe upper and to advance the work and means for wiping in the margin of the updrafted upper, means for delivering a continuous ribbon of sticky liquid adhesive, said adhesive delivery means comprising a tubular guide having delivery orifices so located as to discharge adhesive in substantially parallel but spaced ribbons onto the exposed surface of the shoe bottom and onto the inner surface of the lasting margin, respectively, power driven feed means, including a rotary feed element, constructed and arranged to deliver adhesive in non-tacky condition into the tubular guide, and means to reduce the adhesive to a sticky liquid condition as it nears the delivery orifices.

11. In a lasting machine for shoes of the kind having means for updrafting and inwiping the lasting margin of a shoe upper against the bottom of the shoe, means operative to deliver a continuous ribbon of liquid adhesive into the angle between the updrafted lasting margin and the shoe bottom to which the lasting margin is to be secured and before the margin is wiped in, said adhesive delivering means comprising a support for normally non-tacky, adhesive material, inherently capable of becoming sticky when heated, means operative to advance adhesive from said support, in a continuous ribbon and while still in non-tacky condition, toward said angle, and heating means operative to reduce said adhesive material to the liquid, sticky state immediately before it enters said angle.

12. In a lasting machine for shoes of the progressive type wherein the lasting margin of a shoe upper is subjected to updrafting stresses whose point of application advances uninterruptedly along the edge of the shoe bottom and wherein the updrafted lasting margin is wiped in over the shoe bottom, means for delivering adhesive in the form of a continuous sticky ribbon to the space at the edge of the bottom between the place of applying the updrafting stresses and the wiping in, said adhesive delivering means comprising a support for thermoplastic adhesive in a normally non-sticky solid state, a tubular guide for directing adhesive from the support to said space, a power driven feed element operative to move the non-tacky adhesive along the guide, and means operative to heat the delivery end of the guide thereby to reduce the adhesive to a sticky liquid condition before it emerges from the guide.

13. In a shoe lasting machine of the kind wherein upper gripping means, including a constantly rotating roll, concomitantly updrafts the upper of a shoe relative to its bottom and advances the shoe, and wherein there is means for wiping the updrafted lasting margin inwardly against the bottom, the combination of, means for delivering a continuous ribbon of sticky liquid adhesive to the bottom of the shoe as it leaves said roll, said adhesive delivering means comprising a tubular guide having its lower end arranged to deliver adhesive into the angle between the shoe bottom and the lasting margin of the upper following updrafting and prior to wiping into contact with the shoe bottom, means including a positively driven feed element constructed and arranged to advance thermoplastic adhesive, while in a non-tacky condition, into said tubular guide, and electrically energized means operative to heat the adhesive material and reduce it to fluid, sticky condition before it escapes from the lower end of the guide.

14. In a shoe lasting machine of the kind wherein upper gripping means, including a constantly rotating roll, concomitantly updrafts the upper of a shoe relative to its bottom and advances the shoe, and wherein there is means for wiping the updrafted lasting margin inwardly against the bottom, means for delivering a continuous ribbon of sticky liquid adhesive to the bottom of the shoe as it leaves said roll, said adhesive delivering means comprising a tubular guide having its lower end arranged to deliver adhesive into the angle between the shoe bottom and the lasting margin of the shoe upper following updrafting and prior to wiping into contact with the shoe bottom, means including a positively driven rotary feed element constructed and arranged to advance thermoplastic adhesive, while in a non-tacky condition, into said tubular guide, a body of electrical insulating material embracing the tubular guide, a coil of resistance wire within said body of insulation, and means for supplying heating current to said coil thereby to heat the tubular guide so as to reduce the adhesive to a liquid state before it escapes from the lower end of the guide.

15. In combination in a shoe lasting machine of the progressive type wherein the lasting margin of a shoe is subjected to an updrafting stress whose point of application advances uninterruptedly along the edge of the shoe bottom and wherein the updrafted lasting margin is wiped in over the shoe bottom, of means for delivering a continuous ribbon of sticky liquid adhesive to the edge of the bottom at a place between the updrafting and wiping, said adhesive delivering means comprising a support for adhesive in a normally non-tacky, substantially solid state but which is capable of becoming fluid and sticky when heated, a tubular guide having its delivery end at said place, heat-radiating means at the receiving end of the guide, means for applying heat to the delivery end portion of the guide sufficient to reduce the adhesive to liquid condition, and a power driven rotating feed element located between the support and said place operative to advance the solid non-tacky adhesive from the support into said guide.

16. In a shoe lasting machine of the kind wherein wiping means is associated with means including a constantly rotating roll operative to updraft a shoe upper with reference to its bottom, in combination, means for delivering a continuous ribbon of sticky, liquid adhesive to the bottom at a place between the wiping means and the roll, said adhesive delivering means comprising a tubular guide having its lower end arranged to deliver adhesive into the angle between the shoe bottom and the lasting margin of the upper just before the latter is wiped down into contact with the shoe bottom, means for delivering a normally non-tacky thermoplastic adhesive into said tubular guide, and two electrodes arranged diametrically of the tubular guide and adjacent to the latter, said electrodes constituting the terminals of a high frequency electrical heating unit.

17. The combination in a shoe lasting machine of the progressive type wherein the lasting margin of a shoe is subjected to updrafting stress whose point of application advances uninterruptedly along the edge of the shoe bottom and wherein the updrafted lasting margin is wiped in over the shoe bottom, of means operative to deliver a continuous ribbon of sticky adhesive material in liquid condition to the shoe bottom at a place between the updrafting and wiping, said adhesive delivering means comprising a support for adhesive in the normally non-sticky solid state, a tubular guide for conducting adhesive from said support toward said place, a rotating feed wheel for withdrawing adhesive in the non-sticky state from the support and for advancing it along said guide, and means associated with the guide operative to reduce the advancing adhesive to a liquid, sticky condition as it enters said place.

18. The combination in a shoe lasting machine of the progressive type wherein the lasting margin of a shoe is subjected to updrafting stress whose point of application advances uninterruptedly along the edge of the shoe bottom and wherein the updrafted lasting margin is wiped in over the shoe bottom, of means operative to deliver a continuous ribbon of a sticky adhesive material in liquid condition to the shoe bottom at a place between the updrafting and wiping operations, said adhesive delivering means comprising a reel for supporting a coil of normally non-tacky adhesive in ribbon form, means for positively drawing off the ribbon of non-tacky adhesive from the reel, means for guiding the advancing end of the ribbon into said place, and means for reducing the advancing end of the ribbon to a liquid sticky condition as it enters said place.

19. The combination in a shoe lasting machine of the type wherein the lasting margin of the upper of a shoe is subjected to updrafting stress and is then wiped in over the shoe bottom, of means for delivering a continuous ribbon of sticky liquid adhesive to the bottom of the shoe at a place between the updrafting and wiping operations, said adhesive delivering means comprising a reel for supporting a coil of normally non-tacky adhesive in ribbon form, a rotating toothed feed wheel engaging the ribbon and operative to draw off the ribbon from the reel, means for guiding the advancing end of the ribbon to said place, and means for reducing said advancing end of the ribbon to a liquid, sticky condition just before it enters said place.

20. The combination in a shoe lasting machine of the type wherein the lasting margin of the upper of a shoe is subjected to updrafting stress and is then wiped in over the shoe bottom, of means for delivering a continuous ribbon of sticky liquid adhesive to the bottom of the shoe at a place between the updrafting and wiping operations, said adhesive delivering means comprising a reel for supporting a coil of normally non-tacky adhesive in ribbon form, means providing a passage for the ribbon, a toothed feed wheel whose edge is disposed within said passage, means for rotating the feed wheel thereby to draw off the ribbon from the coil and to propel it along said passage, guide means operative to receive the ribbon delivered from said passage and to direct the advancing end of the ribbon to said place, and means for reducing the advancing end of the ribbon to a liquid, sticky condition just before it enters said place.

21. The combination of a shoe lasting machine of the progressive type wherein the lasting margin of a shoe is subjected to an updrafting stress whose point of application advances uninterruptedly along the edge of the shoe bottom and wherein the updrafted lasting margin is wiped in over the shoe bottom, with means holding a body of solidified, non-tacky, normally shape-retaining adhesive close to the bottom of the shoe at a place between the updrafting and wiping operations, means urging the forward end of the body of adhesive towards the said place, means for rendering the forward end of the adhesive body tacky, and means for guiding the softened homogeneous adhesive continuously and directly into contact with the work at said place.

22. In combination with a shoe lasting machine of the progressive type wherein the lasting margin of a shoe is subjected to updraft stresses whose point of application advances uninterruptedly along the edge of the shoe bottom and wherein the updrafted lasting margin is wiped in over the shoe bottom, a container within which is placed a body of solidified non-tacky, normally shape-retaining adhesive, said container having converging walls terminating close to the bottom at a place between the updrafting and wiping operations and defining an orifice, yieldable means carried by the container for bearing against the solid adhesive and pressing its forward end toward the orifice, and means near the orifice for rendering the solid end of the adhesive soft and tacky whereby the soft adhesive is extruded through the orifice into contact with the work at said place.

23. In combination with a shoe lasting machine of the progressive type wherein the lasting margin of a shoe is subjected to updraft stress whose point of application advances uninterruptedly along the edge of the shoe bottom and wherein the updrafted lasting margin is wiped in over the shoe bottom, a container within which may be placed a large body of solid, non-tacky, normally shape-retaining adhesive, said container having a narrow opening at one end defined by converging walls at that end, means for applying pressure to the solid adhesive in the container in a direction to force its leading end into the converging end of the container, means associated with the converging end of the container to soften adhesive whereby the softened adhesive is extruded through said opening and a tubular guide for receiving the extruded adhesive and carrying it into direct contact with the work.

24. A machine according to claim 23 wherein the pressure is applied by compressed air introduced into the end of the container opposite said opening.

25. A machine according to claim 23 wherein the pressure is applied by a spring.

26. A machine according to claim 23 wherein there is means for releasing the pressure in the absence of work.

References Cited in the file of this patent

UNITED STATES PATENTS

| | | |
|---|---|---|
| 1,709,445 | Tomes | Apr. 16, 1929 |
| 2,188,625 | Dufour et al. | Jan. 13, 1940 |
| 2,251,284 | Kambarian | Aug. 5, 1941 |
| 2,272,780 | Schweyer | Feb. 10, 1942 |
| 2,351,688 | Lee | June 20, 1944 |
| 2,476,290 | Fossa | July 19, 1949 |
| 2,505,602 | Bertrand | Apr. 25, 1950 |
| 2,556,609 | Arkless | June 12, 1951 |
| 2,567,960 | Myers et al. | Sept. 18, 1951 |

FOREIGN PATENTS

| | | |
|---|---|---|
| 2,634 | Great Britain | of 1895 |
| 48,548 | Germany | Sept. 10, 1889 |
| 106,386 | Germany | Nov. 6, 1899 |
| 156,902 | Australia | June 24, 1954 |